C. T. PETCHELL.
Rubber-Belting.
No. 204,368. Patented May 28, 1878.
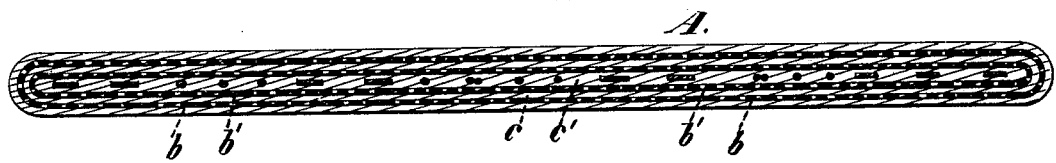
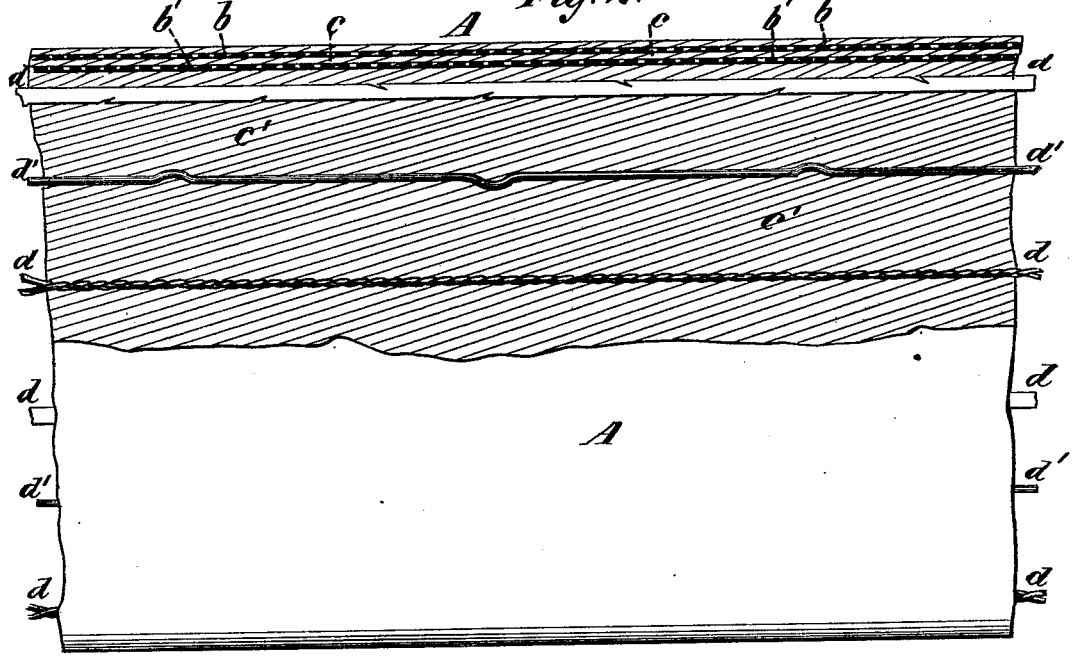

UNITED STATES PATENT OFFICE.

CLEMENT T. PETCHELL, OF BROOKLYN, NEW YORK.

IMPROVEMENT IN RUBBER BELTING.

Specification forming part of Letters Patent No. 204,368, dated May 28, 1878; application filed January 25, 1878.

*To all whom it may concern:*

Be it known that I, CLEMENT T. PETCHELL, of the city of Brooklyn, in the county of Kings and State of New York, have invented a new and useful Improvement in Rubber Belting; and I do hereby declare that the following is a full, clear, and exact description of the same, reference being had to the accompanying drawing, forming part of this specification.

This invention relates to certain improvements in that class of rubber belts constructed of a body of vulcanized rubber, or of vulcanized rubber and woven material, with an interposed or embedded strengthening material to prevent the stretching of the belt; and it has for its object to prevent the slipping or longitudinal displacement of the body of the belt on the strengthening material, consequent upon the stretching-strain to which such belts are naturally subjected.

To this end my invention consists in providing a belt constructed of rubber, or rubber and woven material, with a series of longitudinal strengthening-bands, which are roughened, serrated, corrugated, or twisted in such manner that the rubber of the belt, when said bands are embedded in the same, will seize and hold said bands in such manner as to effectually resist longitudinal displacement therefrom.

In the drawing, Figure 1 represents a transverse section of my improved belt, and Fig. 2 partly an elevation and partly a longitudinal section thereof.

The letter A represents the belt, which, in the present instance, is composed of alternate layers of rubber $C'$ and woven fabric $b\ b'$, the strengthening material being embedded in the central layer of rubber. Said strengthening consists of a series of longitudinal bands or strips, preferably constructed of metal, and embedded in the body of the rubber before vulcanization, so as to become firmly united therewith when vulcanized.

Longitudinal displacement is provided against by means of a series of serrations on the edges, extending in opposite directions on opposite edges of the same, as shown at $d$, so as to effectually hold the rubber from shifting either back or forth thereon, or by corrugating the band at intervals alternately across the said band or strip, as shown at $d'$.

The said longitudinal bands or strips may be connected together by means of transverse bands, if desired, which may also be serrated or corrugated to prevent displacement.

What I claim is—

In a belt, the combination of rubber, or rubber and rubber fabric, with one or more longitudinal strengthening bands or strips, serrated or corrugated on opposite edges or sides, and embedded in the rubber of the belt, whereby longitudinal displacement of the rubber from the strips is prevented, substantially as specified.

CLEMENT T. PETCHELL.

Witnesses:
VERNON H. HARRIS,
FRED. HAYNES.